July 17, 1928.

R. W. BIRCHFIELD

METHOD OF MAKING BOILERS

Re. 17,033

Original Filed Aug. 4, 1923 2 Sheets-Sheet 1

Witnesses:
Harry R. L. White.
W. R. Kilroy

Inventor:
Robert W. Birchfield
By Edward Fay Wilson
Atty.

July 17, 1928. R. W. BIRCHFIELD Re. 17,033
METHOD OF MAKING BOILERS
Original Filed Aug. 4, 1923 2 Sheets-Sheet 2
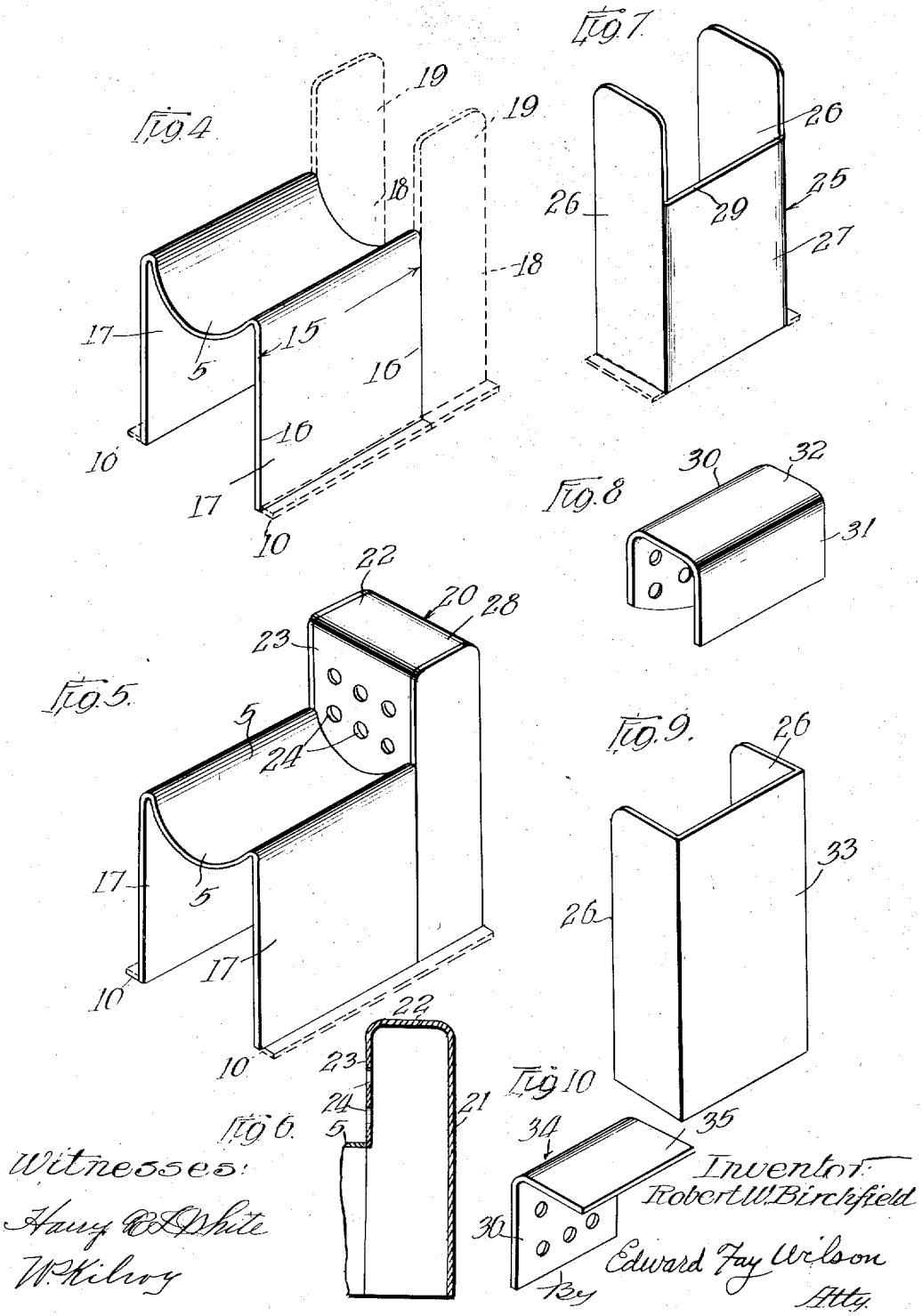

Reissued July 17, 1928. Re. 17,033

UNITED STATES PATENT OFFICE.

ROBERT W. BIRCHFIELD, OF JOLIET, ILLINOIS, ASSIGNOR TO HEGGIE SIMPLEX BOILER COMPANY, OF JOLIET, ILLINOIS, A CORPORATION OF ILLINOIS.

METHOD OF MAKING BOILERS.

Original No. 1,565,542, dated December 15, 1925, Serial No. 655,638, filed August 4, 1923. Application for reissue filed September 19, 1927. Serial No. 220,616.

My invention relates to improvements in methods of making boilers and has special reference to improvements in methods of making the inside shells of boilers which have substantially cylindrical body parts from which water legs depend and provided with auxiliary combustion spaces which rise above the main combustion chambers.

Such a boiler is illustrated in my United States Patent No. 1,393,741.

This present invention has to do especially with the production of such inside shells for very large boilers or for boilers of such length that the parts go beyond the capacity of the machines and tools ordinarily provided for such work.

The inside shell, to the production of which my invention particularly applies, usually consists of an inside wrapper which forms the side walls and crown sheet of the main combustion chamber, a front plate or head and closure plate at the rear which may combine in one member a back plate, a crown sheet for the auxiliary combustion chamber and a flue sheet for the lower flues. It sometimes occurs that the inside wrapper as thus made is longer than the capacity of some of the tools and particularly than the brake or press for producing the concave crown sheet and the reverse bends between the side sheets and the main crown sheet, and to meet this condition I have devised the present method, whereby I take a sheet of a suitable width to make the concave crown sheet and the main side sheets. I first form up this sheet and then I add parts to its rear end portion to make side sheets for the auxiliary combustion space, which rise above the main side sheet portions preferably joining the main and the auxiliary sheets by welding.

In making such extension of the inside shell I may add an auxiliary side sheet part to each of the main side sheets and then close the space between these auxiliary parts by one of my combination back plates, which includes in one member a back plate, an auxiliary crown sheet and a flue sheet, or I may take a plate large enough to be capable of being bent to form in one member the two auxiliary side sheets and the whole or major portion of the back sheet. This back sheet portion in this construction may extend up to the auxiliary crown sheet or it may terminate at a lower point, but wherever it terminates I prefer to close the top with a single member combining in one the lower rear flue sheet and the auxiliary crown sheet, and when I desire to make the rear upper part of the auxiliary combustion space, curved on a relatively large radius, I preferably form the auxiliary closure to include the lower rear flue sheet, the crown sheet of the auxiliary combustion space and said curved portion joining the main back plate portion and the auxiliary crown sheet.

My invention will be more readily understood by reference to the accompanying drawings forming part of this specification and in which:

Fig. 1, is a vertical, longitudinal, central section of a boiler having an inside shell made in accordance with my invention;

Figs. 2 and 3, are vertical transverse sections of the boiler on the lines 2—2 and 3—3 respectively of Fig. 1;

Fig. 4, is a perspective view of the main part of the inner shell, the extension parts of the side sheets being shown in dotted lines;

Fig. 5, is a perspective view of a completed inner shell;

Fig. 6, is a central, vertical, longitudinal section of the inner shell on the line 6—6 of Fig. 5;

Fig. 7, is a perspective view of an extension section in which the extension side sheets and a portion of the back plate are made of one piece;

Fig. 8, is a perspective view of a combined rear flue sheet, an auxiliary crown sheet and a portion of the back sheet for use with the part shown in Fig. 7 for completing the extension part;

Fig. 9, is a perspective view of an extension part somewhat similar to that shown in Fig. 7, but slightly modified; and Fig. 10, is a perspective view of a part for use with that shown in Fig. 9 for completing the inner shell.

Figure 1:
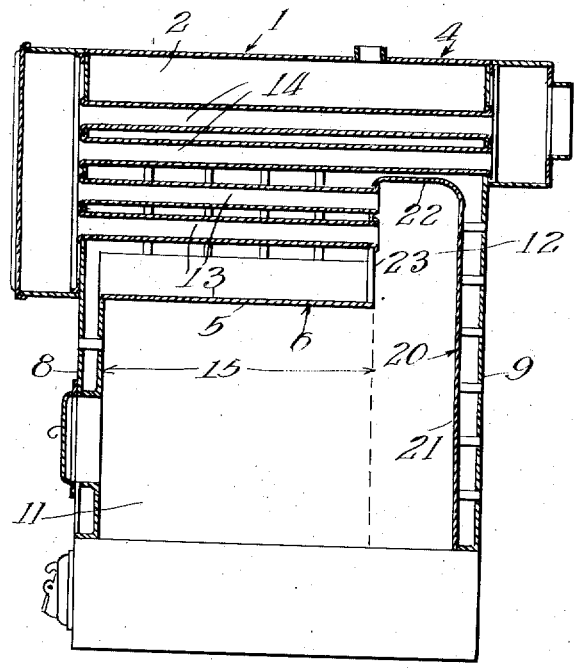
Figure 2:
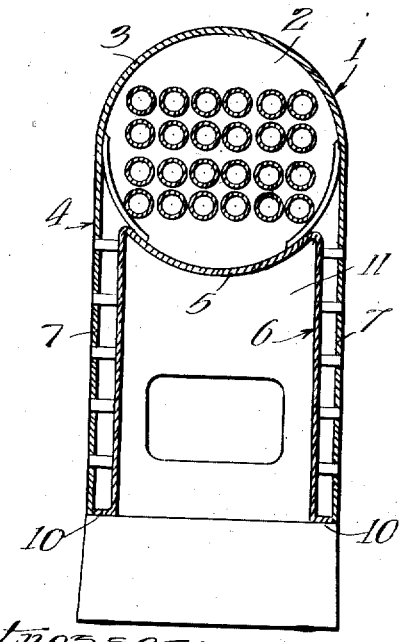
Figure 3:
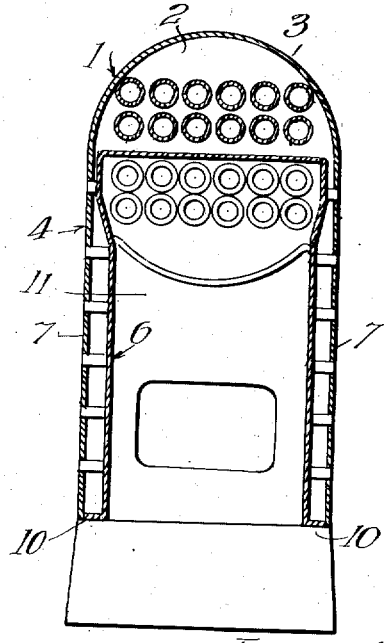

In said drawings 1 illustrates a return flue boiler having an inside wrapper sheet or shell made in accordance with my invention.

The boiler has a main substantially cylindrical body portion 2. The body portion 2 is formed of the curved part 3 of an outer U-shaped shell 4 and the upper curved part 5 of an inner wrapper or shell 6. The boiler is completed by depending water legs 7 at the sides and forward and rear water legs 8 and 9 respectively.

The water legs are closed at their lower ends by horizontal flanges 10 which may be formed on the lower edges of the inside wrapper sheet.

The water legs enclose a combustion space 11 which extends the full length of the boiler and for permitting the gases of combustion to escape therefrom I provide an auxiliary combustion space 12 which rises above the rear end of the main combustion space and admits the gases of combustion into lower forwardly leading flues 13 the gases returning to the rear end of the boiler through the upper longer flues 14.

My invention has particular reference to the formation of the inside shell to provide the main combustion space 11 and the auxiliary combustion space 12, especially in extra large or long boilers.

In accordance with my present invention I provide a flat blank sheet of a length 15 to extend the length of the main crown sheet portion 5 and said sheet having substantially parallel ends 16. The sheet is wide enough to extend from the lower edge of one side sheet portion 17 up to the crown sheet 5, across the crown sheet and down to the lower edge of the opposite side sheet 17. I first form this sheet to provide the main part of the inside wrapper, as shown in Fig. 4, that is the main crown sheet 5 and the depending substantially parallel side sheets 17. This member may or may not have the bottom flanges 10 formed on the lower edges of the side sheet portions.

As hereinbefore mentioned this present invention has to do with the formation of inside shells for boilers which are so long as to be beyond the capacity of the usual machines and tools and for the purpose of making the inside shell long enough, I proceed to extend the side sheets of the inside shell to provide the auxiliary combustion space 12, for this purpose I may proceed in several different ways but in any event I first make the main portion of the fire box with the parallel ends as described and then extend the rear end.

In the preferred form of my invention I provide two extension parts 18 for the side sheets. These parts 18 are wide enough to extend from the rear edges of the main side sheet portions to the rear end of the fire box and are long enough so that their upper end portions 19 extend above the main crown sheet portion 5 sufficient to form the side sheets of the auxiliary combustion space 12. Then I close the rear end of the fire box by a back plate 20 which combines in one plate a rear sheet 21 for the main and auxiliary combustion spaces, a crown sheet 22 for the auxiliary combustion space and a flue sheet 23 for the auxiliary combustion space. I preferably join the edges of the sheets together by welding. The flue sheet portion 27 is provided with holes 24 to receive the rear ends of the lower shorter flues 13.

In Fig. 7 I have shown another form of fire box extension. In this case I form a box-like member 25 which is closed on its sides by extension side sheet plates 26 similar to the plates 18 shown in Fig. 4, but with the distinction that the rear edges of these plates are joined by a back plate 27. In cases where I desire to make the rear upper corner 28 of the auxiliary combustion chamber of relative large radius I preferably cut the back sheet down so that it terminates at its upper edge 29 about the bottom of the auxiliary combustion chamber. I close the top of this box-like member with a U-shaped member 30 comprising an extension 31 of the back plate 27, a crown sheet 32 and a flue sheet 33 for the auxiliary combustion chamber. This member 32 is preferably joined to the upper edges of the member 25 and to the rear edge of the main crown sheet by welding and the forward edges of the extension side plates 26 are likewise preferably joined to the rear edges of the main side sheets 17 by welding resulting in an inner shell, as shown in Fig. 5.

Instead of cutting down the back sheet, as shown in Fig. 7, I sometimes prefer to leave it the same height as the extension side sheets, as shown at 33, Fig. 9, wherein I have shown a fire box extension similar to that already described with this exception.

In this latter instance the top closure is somewhat simpler to make, for as shown in Fig. 10 it comprises an L-shaped member 34 which includes a crown sheet 35 and a flue sheet 36 for the auxiliary combustion chamber.

In like manner to that already described this top closure member, together with the main part and the extension part, completes the inner shell.

While I have shown several different ways of carrying out my invention of extending the side sheets of the fire box, they all include the addition to the main part of the shell of sheets which add to the main part the side sheets of the auxiliary combustion chamber.

As many modifications of my invention will readily suggest themselves to one skilled in the art, I do not limit or confine my invention to the specific steps, or order of steps or specific details of construction herein shown and described.

I claim:

1. The herein described method of forming the inner shell of a boiler, which shell includes a main crown sheet, depending side sheets and side sheets for an auxiliary combustion space rising above the main crown sheet, which method comprises forming a main section of the shell with a suitable crown sheet and depending side sheets and attaching extensions to the rear ends of the side sheet portions having portions which extend above the main crown sheet to form the side sheets of the auxiliary combustion chamber.

2. The herein described method of forming the inner shell of a boiler, which shell includes a main crown sheet, depending side sheets and side sheets for an auxiliary combustion space rising above the main crown sheet, which method comprises forming a main section of the shell with a suitable crown sheet and depending side sheets and attaching an extension plate at each side to the rear edge of the depending side sheet portions, said extension plates having parts extending above the main crown sheet to form the side sheets of the auxiliary combustion space.

3. The herein described method of forming the inner shell of a boiler, which shell includes a main crown sheet, depending side sheets and side sheets for an auxiliary combustion space rising above the main crown sheet, which method comprises forming a main section of the shell with a suitable crown sheet and depending side sheets and completing the rear portion of the inner shell by joining to the rear edges of the side sheet portions a fire box extension member having parts at the sides extending above the main crown sheet for forming the side sheets of the auxiliary combustion space.

4. The herein described method of forming an extension for a fire box of the kind described, which consists in forming a box-like member open on its top front and bottom, the forward edges of the sides being adapted to be joined to the rear edges of the main side sheets of a fire box, and closing the top and the upper part of the front by a single plate joined to the top and forward edges preferably by welding.

5. The herein described method of forming the inner shell of a boiler which has an auxiliary combustion space rising above a main combustion space and which shell includes a main crown sheet, depending main side sheets and side sheets for an auxiliary combustion space rising above the main crown sheet, said method comprising forming a main section of the shell with a suitable crown sheet and depending side sheets, and attaching extensions at the rear portions of the side sheets which project above the edges of the crown sheet to form the side sheets of the auxiliary combustion space.

6. The herein described method of forming the inner shell of a boiler which has an auxiliary combustion space rising above a main combustion space and which shell includes a main crown sheet, depending side sheets and side sheets for an auxiliary combustion space rising above the main crown sheet, said method comprising forming a main section of the shell with a suitable crown sheet and depending side sheets, and attaching an auxiliary plate at each side at the rear end portion of the main side sheets, said auxiliary plates extending above the main crown sheet and arranged to form the side sheets of the auxiliary combustion space.

7. The herein described method of forming the inner shell of a boiler which has an auxiliary combustion space rising above a main combustion space and which shell includes a main crown sheet, depending main side sheets and side sheets for an auxiliary combustion space rising above the main crown sheet, which method consists in forming a main section of the shell with a suitable crown sheet and depending side sheets, and completing the rear part of the shell by attaching auxiliary plates in the planes of the main side sheets and which auxiliary plates project above the main crown sheet to form the side sheets of the auxiliary combustion space.

8. The herein described method of forming the inner shell of a boiler, which shell includes a cylindrical shaped main crown sheet and depending side sheets and side sheets for an auxiliary combustion space rising above the main crown sheet, the main crown sheet being curved downwardly between the upper edges of the main side sheets, and which method consists in forming a main section of the shell with a downwardly curved main crown sheet and depending side sheets, and completing the rear part of the shell by attaching auxiliary plates in the planes of the main side sheets which project above the main crown sheet to form the side sheets of the auxiliary combustion space.

In testimony whereof, I have hereunto set my hand, this 31st day of August, 1927.

ROBERT W. BIRCHFIELD.

CERTIFICATE OF CORRECTION.

Reissue Patent No. 17,033. Granted July 17, 1928, to

ROBERT W. BIRCHFIELD.

It is hereby certified that error appears in the printed specification of the above numbered patent requiring correction as follows: Page 3, line 5, claim 1, strike out the words "to the rear ends" and insert instead "at one end", and lines 6 and 7, strike out "having portions which extend" and insert "which extensions project"; same page, lines 18 and 19, claim 2, strike out "to the rear edge" and insert "at one end", and line 20, strike out the words "having parts"; lines 58 and 59, claim 5, strike out "at the rear portions of the side sheets which project" and insert "to the ends of the main side sheets which extensions project"; lines 73 and 74, claim 6, strike out "at the rear end portion of the main side sheets" and insert "to the end of each main side sheet"; and that the said Letters Patent should be read with these corrections therein that the same may conform to the record of the case in the Patent Office.

Signed and sealed this 21st day of August, A. D. 1928.

M. J. Moore,
Acting Commissioner of Patents.

(Seal)